United States Patent [19]

Stone

[11] Patent Number: 4,468,696

[45] Date of Patent: Aug. 28, 1984

[54] LINE-LOCKED DIGITAL FLUOROGRAPHY SYSTEM

[75] Inventor: Barry N. Stone, Waukesha, Wis.

[73] Assignee: General Electric Company, Schenectady, N.Y.

[21] Appl. No.: 400,495

[22] Filed: Jul. 21, 1982

[51] Int. Cl.³ .................. H04M 5/32; H04M 5/06
[52] U.S. Cl. .................. 358/111; 358/150; 378/99; 331/21
[58] Field of Search .............. 353/111, 336, 339, 337, 353/148, 150; 378/99; 360/32, 37.1, 36.2; 331/20, 21; 369/60, 101

[56] References Cited

U.S. PATENT DOCUMENTS

| | | | |
|---|---|---|---|
| 4,012,592 | 3/1977 | Ricard | 358/150 |
| 4,123,786 | 10/1978 | Cramer | 358/111 |
| 4,156,254 | 5/1979 | Marino | 358/150 |
| 4,196,431 | 4/1980 | Lee | 358/150 |
| 4,204,225 | 5/1980 | Mistretta | 358/111 |
| 4,393,402 | 7/1983 | Keyes et al. | 378/99 |
| 4,425,580 | 1/1984 | Haendle et al. | 358/111 |

Primary Examiner—John C. Martin
Assistant Examiner—Edward L. Coles
Attorney, Agent, or Firm—Fuller, House & Hohenfeldt

[57] ABSTRACT

In a digital fluorography system a television (TV) camera converts X-ray images to analog video signals that are converted to digital pixel words in an analog-to-digital converter (ADC). The sync signals for the TV camera and the sample clock signals for the ADC are derived from a novel resettable crystal controlled sync generator. A phase-locked loop provides an ac reference signal at one-half power line frequency which is equivalent to TV frame rate. The sync generator is reset to start a new frame and an ensuing sequence of crystal controlled horizontal sync pulses only in response to occurrence of ac reference signals so every frame is in registration. A digital video processor (DVP) subtracts a mask image from each image in a sequence of images that are acquired while an X-ray contrast medium is appearing in and disappearing from a blood vessel. The resulting difference images are stored in analog video signal format in an analog video disk recorder. The DVP and, hence the horizontal and vertical sync signals recorded on disk for each frame are also locked to the ac reference signal and are independent of sync signals from the crystal controlled oscillator. A novel digital storage FIFO buffer system couples the digitized pixel data from the ADC to the DVP and compensates for the timing differences between them. During image reprocessing wherein recorded difference images are subtracted from a selected difference or substitute mask image, the sample clock for the ADC is derived from a phase-locked loop that is locked to the recorded horizontal sync signals so the sample clock is varied in correspondence with or modulated by the recorded sync signals.

6 Claims, 6 Drawing Figures

LINE-LOCKED DIGITAL FLUOROGRAPHY SYSTEM

BACKGROUND OF THE INVENTION

The invention disclosed herein are for improving the performance of digital fluorography systems.

This specification corresponds to the specification in copending applications: Ser. No. 400,550, filed July 21, 1982; and, Ser. No. 400,552, filed July 21, 1982; which are assigned to the assignee of this application.

Digital fluorography procedures are used for visualizing blood vessels in the body. X-ray images are acquired by projecting an X-ray beam through a region of interest in the body and using an image intensifier to convert the X-ray image to an optical image. The optical image is viewed by a television camera which converts each image frame to corresponding analog video signals. The analog signals are converted to digital signals corresponding, respectively, in value to the intensities of the picture elements (pixels) that compose the image.

In the procedure for enabling visualizing or display of a blood vessel at least one image, called the mask image, containing the blood vessel and the tissue or bone in its background is obtained before a previously intravenously or arterially injected X-ray contrast medium reaches the blood vessel in the region of interest. This mask image is digitized and stored in a full-frame digital memory. After a short delay following the mask or pre-contrast image, the X-ray contrast medium such as an iodinated compound, begins to flow through the blood vessel. When flow begins a series of additional images, called post-contrast images, are obtained usually at about one second intervals whereupon contrast medium concentration maximizes and finally disappears from the blood vessels. These live post-contrast images are subtracted successively from the mask image and the resulting difference images are stored, usually in an analog video disk recorder or a digital disk memory system. The subtraction process that produces the sequence of difference images is expected to cancel out bone and soft tissue and anything that remains constant between successive images while at the same time letting the contrast medium remain for defining the walls of the blood vessel. If there has been no patient movement between the time the mask image and the post-contrast images are obtained, the difference image that corresponds to maximum contrast medium concentration will ordinarily exhibit the best contrast resolution when the image is displayed on the screen of a television monitor. There are, however, occasions when the maximum contrast difference image or images show artifacts which may be due to body movement during the time between mask image acquisition and the post-contrast images.

Artifacts may result from other causes, too. If no difference image appears to have good enough contrast resolution, a reprocessing procedure is used to obtain such a new difference image in a manner that avoids repeating the X-ray exposures. Reprocessing involves selecting one of the post-contrast images for use as a mask image in place of the original mask. The stored difference images resulting from the first sequence of subtractions are displayed and one is selected near the beginning of the post-contrast interval where little contrast medium is present in the blood within the vessel. Other difference images in the sequence of post-contrast difference images are tested by subtracting them from the newly selected mask image. There is a high probability that at least one of the resulting subtracted images will be without artifacts. In other words, it is likely that a new mask image and another post-contrast image will be found where motion artifacts will be in registry so they will subtract out and let an image of the blood vessel that has satisfactory contrast resolution remain.

To get good contrast resolution in a difference image, it is imperative for the digital pixels in image frames that are to be subtracted to be registered with each other. It is also important that any artifacts which may appear in the video information are the same for pre-contrast, post-contrast and difference images that are to be subtracted. A further requirement is that the vertical and horizontal scanning rates of the television camera acquiring the images remain the same. The process of storing the images on analog video disk and reading out the images from the disk must also be timed in an accurate and reproducible manner. None of these objectives have been satisfactorily achieved until the inventions disclosed herein were made.

Conventional television practices are not satisfactory for digital fluorography systems. They are incapable of obtaining registration of artifacts between successive images so the artifacts cannot be cancelled by subtracting images. The artifacts most difficult to deal with are those that result from stray electrostatic and magnetic fields and other interference that orginates in the ac power lines. Stray fields influence the electron beam that scans or reads out the target of the television camera tube. A weak stray field can deflect the scanning beam by a significant amount where the beam velocity is near zero as it is near the target. The amplitude of the analog video signals can be affected adversely by ac line hum, power supply ripple and electrostatic and magnetic interference. The waveforms of the signals used to sweep the scanning beam may develope glitches due to interference or noise pickup in the scanning coils or electrodes. All of these factors cause greater image quality problems in a digital fluorography system because after the live digitized images are subtracted from the mask, the result must be enhanced or subjected to digital gain. This greatly emphasizes any small artifacts that would not even be seen in cases where live images are displayed directly from a television (TV) camera.

The various interference artifacts are manifested in prior art fluorography systems as a series of regions or hum bars in the displayed image which are not exactly registered with the mask image because the TV camera sync frequencies would not be the same as the power line frequency and the misregistration bars would then roll through the image at a frequency equal to the difference between TV camera vertical frequency and power line frequency. Line-locking methods used thus far suffer either from image size changes or inadequate accuracy.

SUMMARY OF THE INVENTION

In a digital fluorography system, a television camera converts optical versions of X-ray images to analog video signals. An analog video processor conditions the video signals and an analog-to-digital (ADC) converter samples the signals and converts the samples to 10-bit wide digital signals whose values correspond to the intensities of the picture elements (pixels) that compose the X-ray image frame. Means are provided for subtracting a digitized pre-contrast mask image from a series of post-contrast images, respectively, and the difference images which exhibit the blood vessels in the X-ray field are stored on an analog video disk. There must be good registration between subtracted images or artifacts and anything that is constant in successive images will not cancel out. The difference images may be displayed on a television monitor as they are being acquired or by accessing them from the disk.

An important feature of the present invention is to provide a digital fluorography system in which all signal processing subsystem synchronizing signals are locked to power line frequency. In the new line locked system any area of the image that is slightly non-linear or distorted due to interference with power line frequency will not move because the TV camera will run synchronously with the power line. Hence, with the invention, subtracted images do not show artifact areas because no change occurs from image to image.

In accordance with the invention, the sync signals for the television camera and the sample clock signals for the ADC are made very stable and reproducible from frame to frame. This is achieved by using a resettable crystal oscillator controlled sync generator that is locked to ac power line frequency which serves as a reference for reset signals. Reset signals at one-half power line frequency or 30 Hz are used in the described embodiment. 30 Hz corresponds to standard television frame rate and is exemplary but not limiting. Some operating modes may require 7.5 or 15 Hz or full power line frequency or more.

Every time a reference reset signal occurs the sync generator initiates the vertical sync pulse for the television camera and begins generation of the sequence of horizontal sync pulses too. The horizontal sync pulses are very accurately times because of the high stability and accuracy of the crystal controlled clock and because of the independence of the clock from power line frequency variations. Horizontal sync pulses are generated for a complete raster of 525 horizontal lines, more or less, although only 480 lines may contain active picture information in this example. Regardless of whether the last horizontal line is partially completed or even missing and regardless or whether there is time for a partial excess line, the sync generator always resets when the ac reference reset signal occurs so every TV frame and the first pixel in each line of a frame starts at the same time referenced to ac power line. Horizontal sync pulses of crystal controlled accuracy then follow so picture size remains constant from frame to frame and the pixels are registered. The same crystal oscillator supplies the high frequency (nominally 12.096 MHz in the described embodiment) pixel sample clock pulses to the ADC so the ADC maintains a fixed time relation with the television sync pulses.

A digital video processor (DVP) is used for processing signals in various ways including subtracting digitized images. The difference images must be converted to analog video signals and recorded on respective disk tracks of an analog video disk recorder. The DVP has its own sync generator for vertical and horizontal sync pulses that are recorded along with the analog video signals. In accordance with another aspect of the invention, phase-locked loops are used to lock the DVP sync generator to the previously mentioned ac power line reference signal. The previously mentioned crystal controlled sync generator sync signals cannot be used for the recording process because the correction made on a reset pulse basis would often be too great for the servo system of the disk recorder to follow. As is known, the disk recorder servo increases or decreases its speed as required to stay in step with sync pulses. It cannot respond to abrupt and large sync signal corrections. Hence, the DVP sync generator is used since it varies slowly because the ac reference to which it is phase-locked changes relatively slowly.

A problem arises because the sync and sample clock signals that are derived from the crystal controlled sync generator may be out of phase with the sync signals derived from the DVP sync generator. The DVP sync generator must clock the DVP memories for input and output of data. The lines of digital pixels coming out of the ADC during image acquisition can be coming out faster or slower than the DVP memories are synchronized to accept them. In accordance with another feature of the invention, a unique digital storage first-in, first-out (FIFO) buffer system is provided to obviate the effects of the timing difference between the video acquisition circuits and the DVP.

The FIFO buffer system is distinguished by, among other things, using a pre-FIFO memory array in combination with and cooperating with a random access memory (RAM) configured to function as the primary FIFO buffer to minimize the electronic components, especially memory capacity, needed for putting pixel data out at least as fast as it comes in. In the illustrative embodiment serially input 10-bit pixels are converted 5 at a time into 50-bit words which are part of a 768 pixel horizontal video line. This is done under control of the crystal sync generator sample clock. The 50-bit words are loaded successively into the pre-FIFO memory. The phase-locked loop that is locked to ac reference and provides a nominal 12.096 clock to the pre-FIFO memory and the DVP is also divided by 5 to provide the time base for a memory timing circuit that controls output of the 50-bit words from pre-FIFO memory to RAM memory. The pre-FIFO memory is adapted to hold at least sixteen 50-bit words at a time. The pre-FIFO array signals the timing circuit when the pre-FIFO has pixel data and is ready and the timing circuit clocks it into a RAM memory. The RAM that cooperates with the pre-FIFO array is partitioned into six blocks or groups which each have 160 locations, 154 of which are used in the described embodiment to accommodate the 154 words that result from dividing 768 pixels by 5. Address preset logic controlled by the input clock addresses the RAM locations in sequence and in sync with the horizontal input clock pulses to load RAM from pre-FIFO memory. Address preset logic controlled by the output clock does not start to address the RAM until it is partially filled. Then addressing becomes circulating in nature. That is, as 50-bit words are taken out of RAM new data is addressed to the empty blocks and the output addresses just keep on taking out data and stepping around to the beginning to take data out of a block that has been reloaded. The 50-bit output words are then reconverted to five 10-bit pixels each in parallel form for processing in the DVP.

Difference images that are to be accessed from analog video disk for the reprocessing mentioned earlier must be fed through the analog video processor similar to original acquire analog video from the television camera. The video information has been recorded along with more or less variable sync pulses from the phase-locked loop and the DVP sync generator. Also, the time stability of the video disk even with a stable video sync input is typically not adequate to allow performing resubtraction of difference images during remasking or reprocessing operations. Hence, time base correction is needed for proper input of pixel signals to the FIFO buffer system from the ADC. In accordance with the invention, time base correction is achieved by adding only a few components. One is a sync pulse stripper that outputs the 15.75 kHz recorded horizontal sync pulses to the input of a phase-locked loop. The loop follows the horizontal sync pulse frequency faithfully and multiplies it up to the nominal 12.096 MHz sample frequency again. This could be slightly variable because of the recorded sync pulse variation. However, it makes no difference since, in accordance with the invention, the same sample clock frequency drives the ADC and is the input clock to the FIFO buffer system so they always stay in step. In other words, the system is self-modulating.

A more detailed description of the overall digital fluorography system and two subsystems constituting the inventions disclosed herein will now be set forth in reference to the drawings.

DESCRIPTION OF A PREFERRED EMBODIMENT

Figure 1:
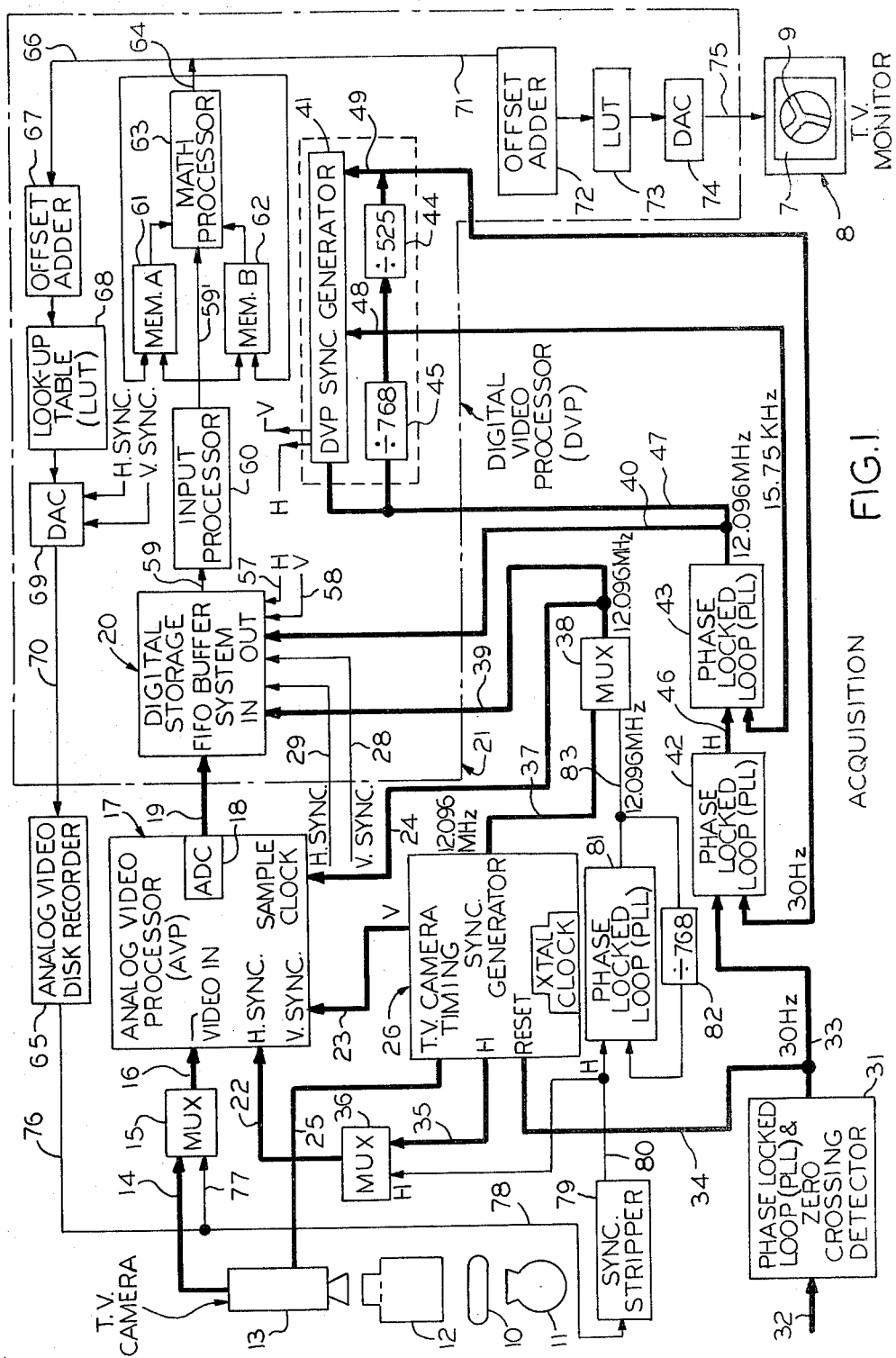
FIG. 1 is a block diagram of a digital fluorographic system, incorporating the inventions, wherein timing and synchronizing lines and buses and data buses that are active during primary image acquisition are indicated by heavy black lines.

The FIG. 1 block diagram shows the digital fluorographic system components to which the inventions described herein are relevant. At the left of this figure, a patient who is to undergo an arteriographic or blood vessel study is symbolized by the ellipse marked 10. An X-ray source for projecting either a continuous X-ray beam or X-ray beam pulses through the patient is marked 11. The X-ray power supply and exposure timing controls have been omitted. X-ray images are received in an electronic image intensifier 12 where they are converted to optical images that are viewed by a television (TV) camera 13. The X-ray images are variously processed but in any case the object is to display the blood vessels on the screen 7 of a television monitor 8 which is located in the rightmost region of FIG. 1. A bifurcated blood vessel 9 is presently displayed on the screen. The vessel appears dark because its interior is defined by blood containing the X-ray contrast medium and the background is white. In an actual system, means are provided for optionally inverting the image intensity so that the vessels are light and the background from which tissue and bone have been cancelled out is dark.

In FIG. 1, the analog video signals representing X-ray images from TV camera 13 are supplied by way of a cable 14 to one input of an analog multiplexer (MUX) 15. During acquisition of either pre-contrast or post-contrast X-ray images, the analog signals are supplied by way of a line 16 to the video signal input of an analog video processor (AVP) which is symbolized by the block marked 17. AVP 17 is basically conventional and is used to amplify, clamp, offset and do impedance matching for video signals by means which are not shown and well known. AVP 17 includes an analog-to-digital converter (ADC) 18. An output bus 19 which is 10-bits wide in this example, transmits the digitized data representative of the image pixels to an input of a digital storage FIFO (first-in, first-out) buffer system which is in a dashed-dot line rectangle that contains the components of a digital video processor (DVP) 21. The FIFO buffer system will be described in substantial detail later since it is one of the inventions disclosed herein that is required to make the digital fluorographic system meet the objectives that were mentioned earlier. DVP 21 will also be discussed in more detail later.

For the sake of example, it may be considered that in this embodiment, each horizontal line of analog video signal is digitized by ADC 18 into 768 successive pixels of 10 bits wide. 480 active pixels per line will be used. There will be 525 television horizontal lines although not all of them will have useful image information. By way of example, 480 horizontal lines containing active picture information are used so the images will be a 480×480 pixel image.

Besides the analog video input line 16 to AVP 17, there is a horizontal (H) sync signal input line 22 and a vertical (V) sync signal input line 23. There is also an input line 24 to AVP 17 labelled "sample clock." The clock signals govern the sampling rate of ADC 18. By way of example and for added clarity that results from using concrete numbers, the sample clock has a nominal 12.096 MHz rate which would result in a pixel being digitized every 82.5 nanoseconds. All timing and synchronizing and sweep signals for the TV camera scan or target readout and for sampling by ADC 18 are generated in a unique resettable crystal oscillator controlled sync generator that is generally designated by the block marked 26. The timing signals for TV camera 13 are transmitted from the sync generator by way of a group of conductors indicated collectively by line 25. Sync generator 26 is controlled by the crystal time base or clock labelled "xtal" clock and marked 27. The properties of crystal controlled sync generator 26 will be discussed to the extent necessary as the general description of the fluorographic system proceeds. However, sync generator 26 will be described in detail later since its construction and operation is another of the inventions that are disclosed herein.

In ordinary television systems where subtraction of perfectly registered images is not a requirement the composite sync signals including H sync and V sync for the television camera readout can be referenced to zero crossing of power line sine waves. Noise that upsets sync timing and produces artifacts on the TV screen is transitory and ordinarily not noticeable on the television screen. Variations in power line frequency are ordinarily of little consequence. It is known, however, that power line frequency may vary on the order of ±0.3 Hz in a 60 Hz system and similarly in a 50 Hz system. This is a significant variation when pixels obtained in image frames at widely separated times must be s_btracted from each other. A frequency variation will shift the time of occurrence of the TV camera vertical sync pulses and, of course, the horizontal sync pulses as well. If either H sync or V sync frequency changes image size will also change. For instance, if V sync frequency slowed down, more horizontal TV lines would be scanned out from the TV camera target during a frame time. If the H frequency slows down, more pixels would be written in a horizontal line. The opposite conditions would be true if V and H frequencies increased. These variables that are inherent in conventional TV systems would result in misregistration from one image frame to the next and would result in a subtracted or difference image that has severe artifacts.

In accordance with the invention, very stable horizontal and vertical sync signals for the TV camera 13 and stable sample clock pulses for controlling ADC 18 to digitize the analog video pixel signals are obtained by locking crystal controlled sync generator 26 to the ac power line by use of a phase-locked loop that is symbolized by the clock marked 31. The input to the phase comparator (not shown) of phase-locked loop (PLL) 31 is the 60 Hz power line 32 frequency. The output from phase-locked loop 31 on line 33 is one-half power line frequency in this example or a nominal 30 Hz ac reference signal as indicated which may vary by ±0.3 Hz for instance. It should be understood that reference output frequency can be line frequency or any submultiple thereof. PLL 31 has a narrow bandwidth and a filter (not shown) having a long time constant of about one second, for example. Thus, noise, glitches and any other transients on the power line do not affect the 30 Hz output because of the delayed loop response. 30 Hz is also the television frame frequency in the illustrative embodiment.

In FIG. 1, the conductors that are active during original X-ray image acquisition are indicated by heavy black lines. Crystal clock controlled sync generator 26 is controlled by the possibly variable 30 Hz ac line-locked reference signal. A line 34 supplies the 30 Hz signals to the reset signal input pin or sync generator 26 which pin is labelled "reset." For the present it is sufficient to recognize that sync generator 26 contains a crystal controlled oscillator or clock which has a frequency of 24.192 MHz in an actual embodiment by way of example and not limitation. This is divided by 2 to yield a precise 12.096 MHz signal which is also the sample clock frequency for ADC 18. Resettable sync generator 26 is reset at a 30 Hz rate in correspondence with the ac power line reference signal derived from PLL 31. Every time a reset pulse occurs, a corresponding vertical sync pulse is output from the pin marked V in the sync generator to two destinations, namely, TV camera 13 by way of line 25 and the V sync input pin of the AVP 17 by way of line 23. Also, every time a reset signal is received by the resettable sync generator, a new series of horizontal sweeps or horizontal sync pulses are output from the pin marked H on the generator through a line 35 to one input of a multiplexer (MUX) 36. The H sync pulses are input to AVP 17 by way of line 22. The distinctive feature of resettable sync generator 26, as will be explained, is that it produces a sequence of accurately timed horizontal sync pulses and is reset by the ac line reference signals to start a new sequence regardless of the number of horizontal sync pulses it has produced after any reset. The sync generator does not restart the vertical sweep until it gets another 30 Hz pulse from PLL 31. The power line frequency and hence the nominal 30 Hz ac reference or reset signal may occur slightly late or early. If late a little more than the 525th line of a 525 raster may be scanned during the ensuing frame. If early the last scan line might be partial or even missing. However, only 480 horizontal lines are used for picture information in this embodiment so no useful information is lost if there is no time for the 525th horizontal sync pulse to occur or if the last scan line is incomplete. The important point is that every horizontal sync pulse sequence for an image frame has a controlled starting point. Since the crystal clock in sync generator 26 is so stable and accurate, there is a high degree of assurance that the time between horizontal sync pulses in any frame and from frame to frame will be constant. Moreover, since PPL 31 follows power line frequency faithfully and is immune to noise, the V sync pulses which follow power line frequency are always followed by the uniform sequence of H sync pulses. Thus, differences in power line frequency have no effect on the accuracy of the horizontal sync pulses during a TV field or frame since they are governed by the accuracy of the crystal clock. In standard television systems lacking the power line-locked schemes disclosed herein, a definite number of horizontal sync pulses, such as 525, must be counted and scanning of 525 lines must be completed before a new horizontal sync pulses sequence is started. Hence, if V or H sync varies it is impossible to maintain picture size and pixel registration coincident from frame to frame. And, as indicated earlier, the differences in TV camera and power line frequencies would cause a series of regions or bars in the images which are not registered with the mask and, hence, would not cancel out by subtraction.

Sync generator 26 has some of the characteristics of standard sync generators in that it derives all of the TV camera signals such as the vertical drive, horizontal drive and sync, blanking and equalizing signals for composite video and sends them to the camera by way of line group 25. Every time readout or scan of the TV camera 13 target is initiated by a vertical sync pulse, the analog video signals as previously mentioned, are transmitted through MUX 15 to AVP 17. ADC 18 in AVP 17 then converts the analog video signals to corresponding digital pixel values in succession during each horizontal line and these digital data are input to digital storage FIFO buffer storage system 20. The sample clock pulse train for ADC 18 is an output from sync generator 26 by way of line 37. This line is an input to MUX 38 whose output line 24 leads to the sample clock input pin of AVP 17 and this sample clock is used by ADC 18. The sample clock rate in this example is an accurate crystal time-based 12.096 MHz.

The digital pixel data representative of pre-contrast medium X-ray images and post-contrast medium images is subtracted and operated on in various ways in digital video processor (DVP) 21. Live image data is clocked from ADC 18 into the digital storage FIFO buffer system at the 12.096 MHz sample clock rate that is derived from the crystal controlled oscillator 26. A heavy line 39 leads from MUX 38 to the input clock pin which is labelled "IN" on the digital storage FIFO buffer system (DSF) 20. The DSF buffer system 20 is used to account for the fact that the timing of DVP 21 during image acquisition as in FIG. 1 is different than the sync or timing of TV camera 13 and AVP 17. DSF buffer system 20 will be described in detail later. For the present, it is sufficient to be aware that DSF buffer 20 has a capability for storing a predetermined number of horizontal video lines to account for a timing difference between the AVP 17 and the DVP 21. Readout of the DSF 20 on a line-by-line basis is accurately controlled and referenced or locked to power line frequency in accordance with the invention. The clock signals for readout or output of DSF 20 are provided by way of a line 40 from a phase-locked loop system which is referenced to the 30 Hz signal on line 33 and, hence, to power line frequency. The phase-locked loop system for timing the DVP 21 will be described momentarily.

It may be noted at this juncture that since crystal controlled sync generator 26 was reset in response to possibly time varying ac power line nominally 30 Hz reference signals it is necessary to account for the difference between the TV camera frame time and the operations of DVP 21 whose timing signals are derived directly from the 30 Hz reference from PLL 31. In other words, the TV camera 13 horizontal synchronization may be running faster or slower than the DVP 21. Hence, the pixel data words coming out of ADC 17 at the rate of the crystal sync generator sample clock is not necessarily lined up with the clock that must control DVP 21. The clocks could possibly have the same frequency but they could be out of phase. Since the digital storage FIFO buffer system 20 in FIG. 1 uses a pre-FIFO that has a capacity for sixteen lines but in this case stores six horizontal lines of information, its readout can be centered on a given line such as line 3 and there can be an error in phase or frequency of ±3 lines per frame. If the input clock to the DSF buffer 20 on line 39 slows down, then the output clock supplied through line 49 empties the data from the pre-FIFO relatively faster so the pre-FIFO would not have as much data in it. The converse is also true. At the end of any frame, the FIFO memory that cooperates with the pre-FIFO is cleared out and restarted. At this time, no data is lost because the raster has already gone beyond the useful data or active picture area. As mentioned earlier there are 525 horizontal lines available but only 480 lines are read out and stored. The remainder may be used for blanking time and the like. It may also be noted that with a 12.096 MHz ADC sample clock frequency used, 768 samples per horizontal line are possible. 480 pixel samples per line are used, however. One pixel sample is taken every 82.5 nsec.

The DVP sync generator in FIG. 1 is represented by the block marked 41. Some output lines from DVP sync generator 41 are labelled H sync and V sync. These lines will be understood to connect to various components in DVP 21 such as to digital memories to time or synchronize them for loading and unloading, DVP sync geneator 41 is locked to the 30 Hz power line reference output from PLL 31. The two phase-locked loops used for this purpose are represented by the blocks marked 42 and 43. The dark or heavy lines interconnecting the components of this loop system are indicative of the system being active during X-ray image acquisition. PLLs 42 and 43 are basically conventional but are characterized by having error amplifiers (not shown in FIG. 1) which have a substantial amount of gain and which are associated with filters (not shown) that have narrow bandwidths and relatively long time constants. PLLs 42 and 43 are on the same board as the DVP 21. The divider for PLL 42 is represented by the block marked 44 and, as indicated, it divides by 525. Another divider block 45 divides by 768. Division by 525 in a phase-locked loop is equivalent to multiplying the input frequency through the loop by 525. Thus, PLL 42 has a 30 Hz input and multiplying it by 525 results in its output frequency on line 46 being the horizontal video sync frequency of 15.75 kHz in this embodiment. Further division by 768 is equivalent to multiplying the 15.75 kHz input to PLL 43 by 768 in which case the output from PLL 43 is nominal 12.096 MHz equivalent to the sample clock frequency in this example. The latter frequency is supplied by way of line 47 through the divider loop and DVP sync generator 41. The 15.75 kHz horizontal sync frequency appears on line 48 and the V sync or 30 Hz frequency appears on line 49.

Figure 3:
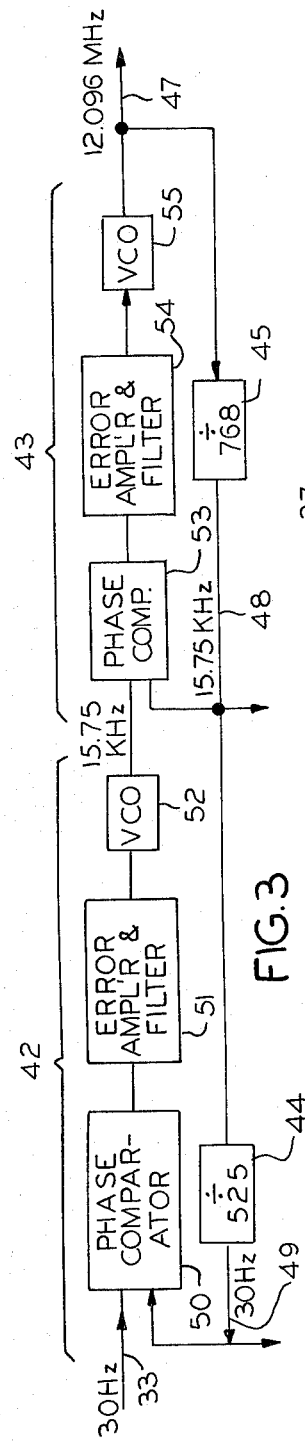
FIG. 3 is a diagram of a phase-locked loop that has been isolated from either FIGS. 1 or 2 to facilitate describing it.

FIG. 3 is a redrawing in more conventional form of phased-locked loops 42 and 43. Typical loop 42 comprises the customary phase comparator 50, an error amplifier and filter circuit 51 and a voltage controlled oscillator (VCO) 52. The divider 44 for the one loop is also shown. The frequencies at the various points are also labelled. Phase-locked loop 43 is similarly comprised of a phase and frequency comparator 53, an error amplifier and filter 54 and a VCO 55. Divider 45 is also shown.

DVP 21 is shown only in sufficient detail to enable discussing its main functions. A more detailed description of a suitable digital video processor is given in the co-pending application of Andrews, et al, Ser. No. 321,307, filed on Nov. 13, 1981, which application is assigned to the assignee of the present application.

The components of present interest in DVP 21 are an input processor 60, memories A and B represented by the blocks 61 and 62 and a math processor 63. Bus 59 connects the DSF buffer system output to the input of input processor 60. One of the functions of input processor 60 is to convert digital pixel words that are output from DSF buffer system 20 to equivalent logarithmic values. Assume that a mask image exposure has been made. Pixel after pixel in each horizontal line and all of the horizontal lines constituting a frame are converted to their logarithms in input processor 60 and may, for example, be stored in full frame memory A. Now assume that the X-ray contrast medium has arrived in the blood vessels of interest and a sequence of post-contrast X-ray images are to be acquired. The pixels for the first image in the sequence may be supplied directly by way of a 10-bit bus 59' to an input of math processor 63. The math processor subtracts the live pixels now being obtained from the corresponding mask image pixels in memory A and outputs the difference image data on a parallel bus 64. The digital difference image data is reconverted to analog video signals for recording in analog video disk recorder 65. Disk recorder 65 records the H sync and V sync composite video signals which are provided by DVP sync generator 41 along with the analog video signals. The DVP image data output bus 64 is connected by way of a bus 66 to an input of a gain and offset adder 67 whose output is an input to a lookup table (LUT) 68 wherein the data is subjected to a transfer function that raises it to the full dynamic range of the video system. This process enhances any small artifacts not normally seen in live images directly from a TV camera. But with the accurate registration of successive images obtained with the invention, even large artifacts are of little consequence since they are cancelled when they are truly registered. The digital data from LUT 68 is an input to a digital-to-analog converter (DAC) 69 which is operating at video rates. The offset adder 67, LUT 68 and DAC 69 are synchronized by timing signals from DVP sync generator 41. The horizontal and vertical sync signals for recording are inserted in DAC 69 as shown. The analog video signal output from DAC 69 is supplied by way of a line 70 to analog video disk recorder 65. Video disk recorder 65 records a full television frame on each disk track along with the composite video signals.

As the difference image frames resulting from subtracting a mask from post-contrast images are being produced, they are also usually being displayed on the screen of television monitor 15 concurrently with being recorded by analog video disk recorder 65. A bus 71 which is connected to math processor output bus 64 supplies the digital video data to another offset adder 72. An LUT 73 and a DAC 74 perform the functions of LUT 68 and DAC 69 such that the analog video signals can be supplied by way of a line 75 to television monitor 15 in real-time with difference image acquisition.

As indicated earlier, the basic objective of the system is to produce a subtracted or difference image that exhibits the best contrast resolution and definition of the blood vessels containing the contrast medium. Images which are best for study by the radiologist can be determined by displaying on the TV monitor the difference images that are stored on the respective tracks of the analog video disk 65. Review of the recorded images involves feeding the analog video signals representing them by way of output line 76 from video recorder 65 to one of the inputs 77 of MUX 15. The analog video signals then go through the same processing chain as the original video signals from TV camera 13 whereupon the resulting digital pixel signals again are provided on the output bus 64 of the math processor from which they are again converted and used to drive TV monitor 8. In some cases, there may be artifacts due to patient movement during an imaging sequence or there may be other defects in the difference images such that none of them will be completely suitable for study. In such cases, remasking or reprocessing of the stored images becomes desirable. The system described herein permits reprocessing for difference image improvement without requiring additional X-ray exposures.

Before discussing the reprocessing mode in detail, the characteristics of a conventional analog video disk recorder 65 should be considered. AS is known, the disk in a commercial analog video disk recorder is rotated at a substantially constant speed with a servo motor system. The servo motor is regulated in response to the horizontal sync signals that are recorded on the tracks of the recorder disk. The servo system is capable of responding to or correcting for minor variations in the time between successive horizontal sync pulses but it cannot tolerate any significant shift or jump in position due to sync correction. In other words, the servo cannot change the position between the track and read or write head quickly enough to preserve perfect synchronism. If the vertical and horizontal sync to the video disk recorder were supplied from the resettable crystal controlled sync generator 26, the disk recorder servo would react violently if there were a slight error or change in the sync time which is likely to be the case since crystal sync generator 26 is reset by the 30 Hz frequency related to line frequency which is likely to vary. So if the vertical sync to the disk recorder 65 would come in late or early, it is going to look like an error to the servo system which will react violently in an effort to slow down or speed up the disk. The servo is phase-locked with a loop to the recorded vertical and horizontal sync signals to get around the shock that would result from introducing these sync signals from an independant source.

In accordance with the invention, the line-locked signal to the DVP sync generator 41 can vary in correspondence with the 30 Hz line-locked signal from PLL 31 in which case the 15.75 kHz horizontal sync signal and the 30 Hz vertical sync signal supplied from the DVP sync generator 41 could vary but the change is so slow that the servo of the disk recorder can follow it since there is never a stepped variation. Thus, in accordance with the invention, the start point of line 1 of a frame and the end point of line 525 will be in coincidence for each successive frame. There will always be the same amount of data on a track, that is, the data for one full frame will be obtainable from one disk track revolution. Thus, even though there may be hum bars or other artifacts in a succession of frames, if any two of these frames are subtracted, anything that is constant between successive images will be cancelled out.

The difference images stored on analog video disk resulted from subtracting live post-contrast images and mask images. Typically for any run, about 20 difference images will be stored. If a new mask is required, the first or one of the early post-contrast images in the sequence can be selected for reprocessing. This difference image would contain very little of the contrast medium so it can be used as a mask. The first new mask is actually one of the corresponding first pre-contrast difference images from which the original mask has been subtracted. Somewhere in the sequence of post-contrast images there is a difference image in which there is a maximum or near maximum contrast medium concentration. Assume for the sake of example that this is the 10th post-contrast image in the sequence which is designated $I_{10}$. It is also a post-contrast image from which the original mask has been subtracted. Now if the new mask $I_1$ is subtracted from $I_{10}$ a difference image results wherein the mask which may have had body tissue motion or some other artifact will be cancelled and a well-registered subtraction image will result. In reality, the user radiologist would run through a display of the stored images to pick a good pair with little or no contrast medium in one and much more in another to produce the ultimate difference image that is used for studying the configuration and condition of the blood vessel.

The reprocessing mode will now be discussed in greater detail in reference to FIG. 2 where the lines that are active during reprocessing are intensified or blacker than the others.

For reprocessing the disk recorded analog video signals have to be converted digital values again and sampling of the lines of analog video signals must be made in correspondence with the times at which the original digital pixel signals were converted to analog form. If sampling of the analog video signals for successive images does not occur in the same time relationship, the images cannot possibly be properly registered for subtraction. Any two stored subtraction images subject to reprocessing will be on different tracks of the disk recorder. The highest quality commercially available analog video disk recorders have an accurate servo disk drive system but it is not sufficiently accurate for image subtraction purposes. The best servo systems of which applicants are aware have a time jitter of ±50 nsec. A typical pixel time is 82.5 nsec. Hence, there could be a 50 nsec error in the other so a 100 nsec timing error could occur. Servo jitter results in no two images on different tracks lining up perfectly. The frame data on one track might be longer or shorter than an adjacent track. A feature of the overall system invention is a time base corrector which negates the inaccuracies of the disk recorder drive.

Figure 2:
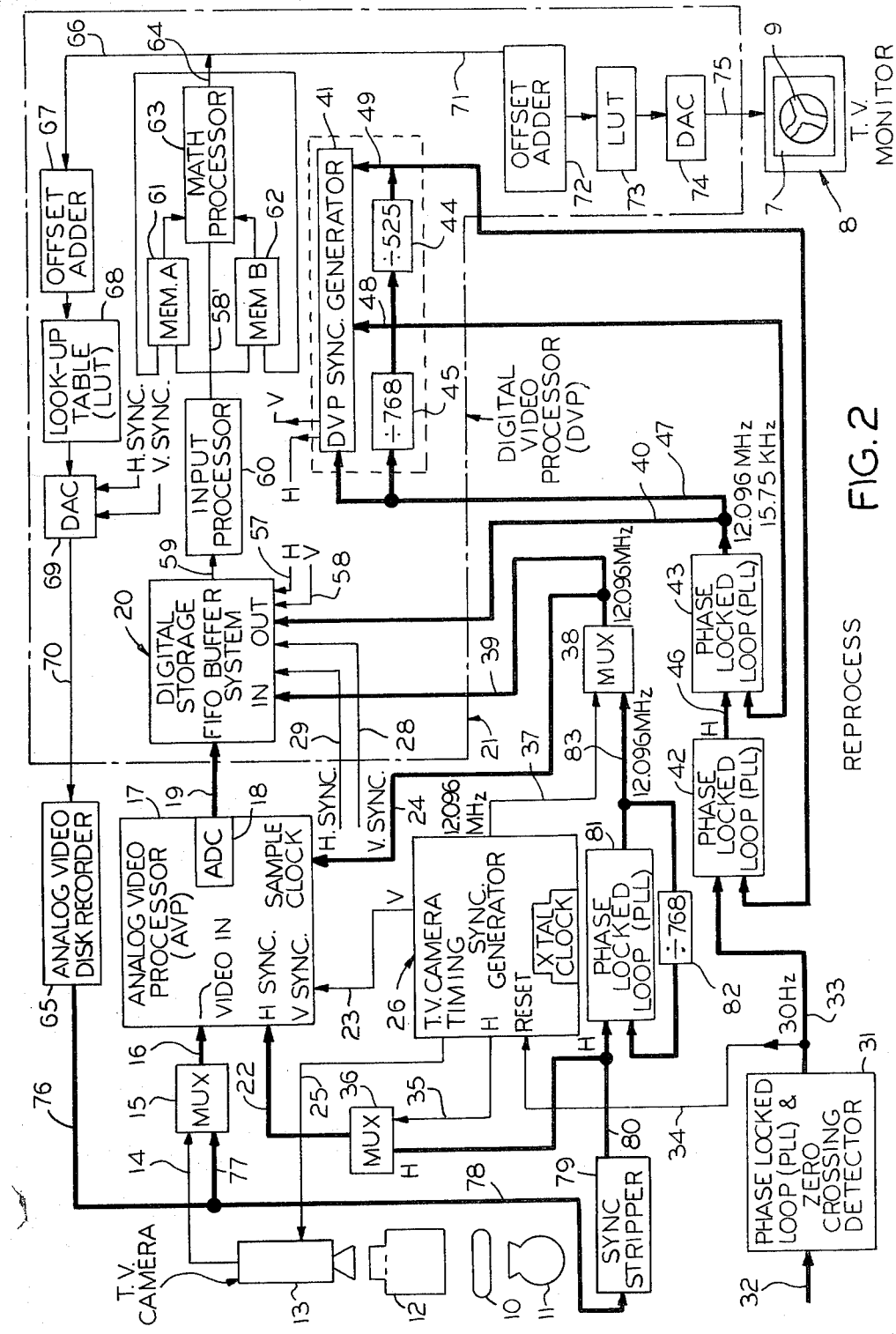
FIG. 2 is structurally identical to FIG. 1 except that the heavy black lines are those which are active when the system is in the image reprocessing (also called remasking) mode.

Referring to FIG. 2, in accordance with the invention, for reprocessing the analog video signals from disk recorder 65 are output by way of line 76 to two destinations. One destination is to MUX 15 by way of its input line 77. The analog video signals are then digitized in ADC 18 in the manner in which the original analog signals from the TV camera 13 were digitized. In the case of reprocessing, the digital pixel data can be stored in one of the full-frame memories 61 or memory A, for example. In the reprocessing mode, in accordance with the invention, the sample clock for ADC 18 is not derived from crystal controlled sync generator 36 but is obtained from and is modulated or continuously adjusted by the vertical and horizontal sync pulses that were stored on the disk along with the video information that was output from the DVP 21 during image acquisition. Recall that any variations in these sync signals are slow enough to be followed by the servo drive of the video disk recorder because they were power line-locked by way of PLLs 31, 42 and 43.

To correct for the recorded horizontal sampling frequency of acquisition being imperfect, the analog video signals from disk recorder 65 are transmitted by way of a line 78 to the input of a sync pulse stripper 79 which is a stage of a time base corrector. The sync pulses are stripped from composite video and the horizontal sync pulses are output on a line 80 to an input of MUX 36 from which they are fed by way of line 22 to the H sync input pin of AVP 17. The V sync signals need not be used for reprocessing.

The horizontal sync pulses H are also input to another phase-locked loop represented by the block marked 81. The frequency of the H sync pulses is 15,750 Hz approximately. By using a divider 82 which effectively multiplies the horizontal input frequency to PLL 81 by 768 a sampling frequency of nominally 12.096 MHz is produced on output line 83. This is the high frequency ADC sample clock which is supplied through MUX 38 to ADC 18 by way of line 24 and to the DSF buffer system by way of line 39. Now the ADC sample clock and FIFO buffer system input clock are locked to the horizontal sync pulses recorded on the respective disk tracks. Thus, samples for digitizing will always be taken where they were recorded in relation to the horizontal sync pulses. If the horizontal line gets longer in time because the disk slowed down, the sampling frequency slows down and vice versa.

During reprocessing, the differences in timing or synchronization between the AVP 17 and DVP 21 are again accounted for by using the DSF buffer system. The output clock for the DSF buffer system is power line-locked with PLLs 31, 42 and 43 as is the case during image acquisition. Timing of DVP 21 is line-locked during reprocessing as in acquisition as indicated by the heavy black lines 47, 48 and 49 in FIG. 2. It should be noted that one of the merits of the system is that, to a large extent, the same electronic components are used for original image acquisition and for image reprocessing so manufacturing cost is reduced by a substantial amount.

As indicated earlier, any one of the difference images exhibiting a low concentration of X-ray contrast medium may be put in memory A during reprocessing for use as a new mask. Another image from another track of the disk recorder may be put in memory B. The two frames from memory A and B may then be subtracted with the math processor and the results displayed on TV monitor 8. Various pairs of images may be selected for subtraction and reprocessing until one is found that is clearly superior to the others insofar as absence of artifacts is concerned. As long as te incoming data to DVP 21 is time base corrected there will be a high degree of certainty that the pixels in any two replayed images will be coincident in memories A and B since the pixel data for these images is stored in the DVP memories under the control of the power line-locked DVP sync generator 41.

Previously mentioned crystal controlled sync generator 26 will now be described in greater detail in reference to FIG. 4. Crystal clock 27 in FIG. 1 is labelled crystal oscillator clock in FIG. 4 and has the same reference numeral 27. It is basically a crystal oscillator that outputs pulses at a 24.192 MHz frequency, by way of example, on its output line 90. A divider represented by the block 91 divides this frequency by 2 and yields the accurate 12.096 MHz sample clock for ADC 18 which is the same as the digitized pixel input clock for FIFO buffer system 21 and is supplied by way of lines 37 and 24 and 39 in FIG. 1.

Figure 4:
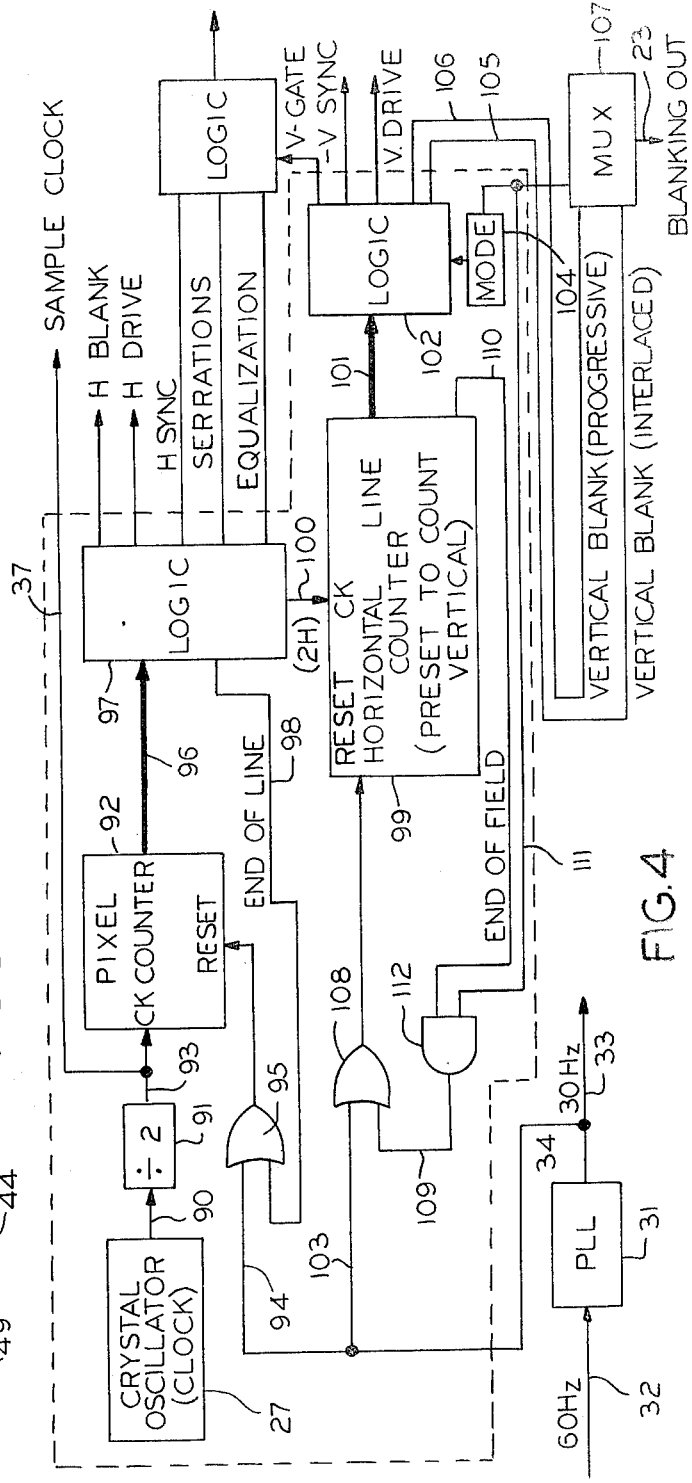
FIG. 4 is a block diagram of the new crystal oscillator controlled sync generator that has been isolated from FIGS. 1 or 2 and is expanded to show more details.

PLL 31, which is the means for locking or referencing the circuitry to the ac power line frequency is repeated in FIG. 4. The 30 Hz ac reset signal line is again marked 34. Sync generator 26 includes a digital pixel counter 92. The input clock to this counter is the stable 12.096 MHz clock signal by way of line 93. Counter 92 produces a count corresponding to the number of pixels in a horizontal video line. In this illustrative embodiment, 768 pixels are counted off and counter 92 is reset to begin counting off the number of pixels for the next horizontal line. The count for the first pixel in the first horizontal line of a frame begins with a 30 Hz ac reference signal being gated from the input line 94 of an OR gate 95 to the reset pin of pixel counter 92. In other words, every new frame is started when a 30 Hz ac reference signal is received on the reset pin of pixel counter 92 and on the reset pin of a horizontal line counter 99 which will be described. The output lines 96 from pixel counter 92 are input to a logic module 97 which includes a programmable read-only memory (not shown) that translates counts from the counter into the horizontal blanking, drive and sync signals for TV camera control. At the end of every horizontal line, that is, after 768 pixels have been counted, logic module 97 puts out an end-of-the-line signal at horizontal line rate by way of line 98 to an input of OR gate 95 which resets the pixel counter 92 to start counting the 768 pixels for the next horizontal line. Thus, there is assurance that every horizontal line will contain the same number of pixels in the same time relationship to the ac reference signal from frame to frame and that the time between lines will also be constant.

Sync generator 26 also includes a digital counter 99 that counts the number of horizontal lines. Logic module 97 outputs pulses corresponding to twice the horizontal line rate (2H) to horizontal line counter 99 by way of a line 100. The horizontal line counts are delivered from counter 99 by the output lines 101 to a logic module 102 which is similar to module 97 except that module 102 had programmable read-only memories which translates the count to the vertical sync, drive and blanking signals for video. A raster contains a nominal 525 horizontal lines. However, horizontal line counter 99 is reset by the 30 Hz ac reference pulses by way of line 103. Every time a reset pulse occurs, horizontal line counter 99 terminates its count which occurs when the last raster line is only partially completed. Whenever a 30 Hz ac reference signal is received, horizontal line counter 99 is reset to begin counting another set of horizontal lines. Thus, it will be seen that each of the 30 Hz ac reference signals will start a new frame. In other words, the reference signal starts the pixel counter 92 to count the first pixel in the first horizontal line of a new frame and counting as described above. Coincidentally, horizontal line counter delivers the count to logic module 92 that results in the vertical timing pulses being produced exactly at the time that the last pixel was counted because this time coincides with receipt of the ac reference signal by counter 39.

It will be evident to those skilled in the art that the system described thus far differs from prior art systems in that prior systems always count a definite number, such as 525, of horizontal lines and then start a new frame. Thus, there could be no assurance that successive image frames and the artifacts therein would register. Typically, conventional means are used for obtaining a line-locked frequency. Horizontal timing is generated using appropriate logic and some fixed count of a master oscillator frequency. The vertical timing is obtained with logic and a given countdown of the horizontal counter. The vertical output is then compared in phase to the ac line signal and an error voltage is generated proportional to the phase difference of the two signals. The error voltage changes the control voltage and thus the frequency of the oscillator until the vertical timing is in phase with the ac line as is typical of a phase-locked loop. However, as is known, phase-locked loops of this type have associated with them some amount of noise that is seen as jitter of the vertical output with respect to the given phase of the ac signal. Since the frequency of the master oscillator is forced to change to compensate for this noise, the horizontal frequency will vary as a function of time so that subtraction of X-ray images obtained at different times could not be done accurately.

In sync generator 26, every frame is initiated by an ac reference signal which may vary in time from signal-to-signal. This is of no consequence, however, because, in any case, use of the power line locked crystal oscillator assures that every pixel in every successive frame will be coincident because what happens after a frame is started is governed by the extreme accuracy of the oscillator.

In FIG. 4, horizontal line counter 99 is being driven at the double horizontal line (2H) rate of the pulses coming from logic module 97. Counter 99 addresses logic in module 102 which results in the module outputting the vertical sync, vertical drive and blanking pulses for video. A completely versatile fluorographic system requires providing for reading out or scanning th TV camera target in either the progressive scan mode or the interlaced scan mode. Logic module 102 determines how many counts from counter 99 are required to make up the vertical sync, vertical drive and vertical blanking signals for either progressive scanning or interlaced scanning. A block labelled mode and having the reference numeral 104 contains the means by which the user may select the scanning mode. If the progressive scanning mode is selected, the vertical blanking pulses are output from logic module 102 on a line 105. If interlaced mode is selected, the vertical blanking pulses are output on a line 106. Lines 105 and 106 are input to a multiplexer 107 which is activated by the mode module 104 to pass either of the selected blanking pulses to the multiplexer output line 23 which is the input for the composite vertical sync pulses to the AVP 17 in FIG. 1.

In FIG. 4 an AND gate 112 is provided. One of its two input lines 111 is reset to a high logic level when mode control 104 is used to select the interlaced scan mode. An end-of-field high logic level signal produced by horizontal line counter is another input to AND gate 112 by way of line 110. Since the 2H input is twice as fast as H (the horizontal line rate for a frame) there will be an end-of-line signal every $262\frac{1}{2}$ lines. In the interlaced scan mode where the AND gate is enabled by the high logic signal on input line 111, a high logic level is output on line 109 to OR gate 108 and this will reset the horizontal line counter as a vertical sync pulse would do for a new field. Of course, the new frame would be started by reset of counter 99 by the ac reference or line lock reset by way of line 103 and OR gate 108. For the progressive scan mode, input line 111 to AND gate 112 is held at a low logic level by mode selector 104, so the AND gate is disabled from resetting counter 99 at the end of a field. Resetting to start a new frame is again achieved by coupling the 30 Hz ac reference signal on line 103 through OR gate 108.

The objective achieved with the method just described is that the TV camera target readout is synchronized to power line frequency which keeps any artifact or nonlinearity in the TV sweeps stationary with respect to the image. These artifacts will then cancel out during the substraction process since they do not move in or roll through the image. Any cumulative error during a sequence of horizontal lines is taken out at the end of each scan because the next scan is again resynchronized to the ac power line reference.

The digital storage FIFO buffer system 20 whose functions have beed described in general terms will now be described in greater detail in reference to FIG. 5. As previously indicated, FIFO buffer system 20 compensates for the difference in timing between the digital image input circuitry which is governed by crystal controlled sync generator 26 during image acquisition or the time base correction phase-locked loop during reprocessing and the digital video processor 21 whose timing is governed by DVP sync generator 41 that is driven by power line referenced phase-locked loop 42 and 43 output. Recall also that it was because of the slow response rate of the servo system of the video disk recorder 65 that the disk recorder had to be synchronized with slowly changing power line referenced sync correction signals derived from DVP sync generator 41 rather than from crystal control sync generator 26 with which the servo of the disk recorder could be significantly out of phase.

Figure 5:
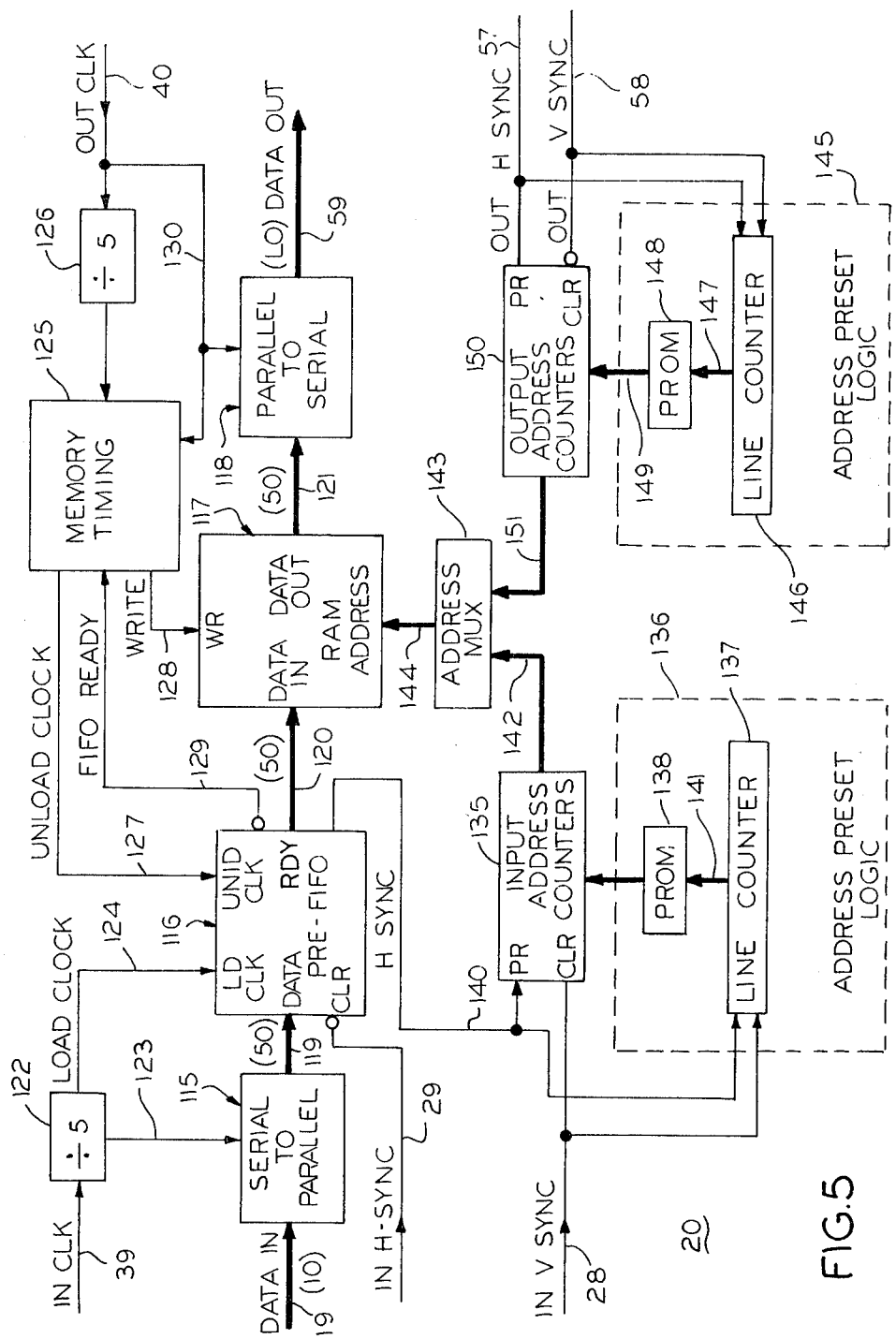
FIG. 5 is a block diagram of the new digital storage FIFO buffer system that has been isolated from FIGS. 1 or 2 and is expanded to show more details; and, FIG. 6 is a timing diagram, composed of parts A, B and C, which is useful for describing operation of the buffer system.

In FIG. 5, the pixel data input bus to the buffer system 20 is marked 19 as it is in FIG. 1. Since the pixels from ADC 18 are digitized to ten bits, bus 19 is indicated to be a 10-bit bus by (10). At the right side of FIG. 5, the pixel data output bus 59 is repeated and as can be seen in FIG. 1, is the input to input processor 60 of DVP 21. The main components between the input bus 19 and output bus 59 are a serial-to-parallel converter 115, a pre-FIFO memory array 116, a random access memory (RAM) array 117 and a parallel-to-serial converter 118. Buses 119, 120 and 121 are 50 bits wide for reasons which will be clarified shortly.

In the upper left region of FIG. 5, the 12.096 MHz clock line 39 which is the accurate crystal controlled clock pulse train supplied from sync generator 26 in FIG. 1 is repeated. The output clock line 40 for the FIFO system is repeated in the upper right region of the FIFO system diagram. This nominal 12.096 MHz clock is locked to the ac power line and varies in time with errors in power line frequency.

The 12.096 MHz input clock on line 39 is divided by 5 in a divider 122. Since it is the pixel clock rate that is being divided, five 10-bit pixels will enter serial-to-parallel converter 115 during every load clock cycle. The serial-to-parallel converter is clocked by a line 123 coming out of the divider 122. The divider also supplies the load clock to pre-FIFO 116 by way of a line 124 which connects with the load clock (LD CLK) pin of pre-FIFO 116. Serial-to-parallel converter 115 converts five 10-bit pixels at a time to 50-bit parallel words that are output on 50-bit wide data bus 119 which is input to pre-FIFO 116.

Pre-FIFO 116 is called a pre-FIFO because, even though it is used somewhat in the manner of a conventional FIFO memory, it is only one of the parts of the system that participates in the first-in, first-out action. The main part is RAM 117 which, as will appear later, is operated and structured in such manner as to minimize the amount of memory capacity that is necessary for handling the high speed data.

In an actual embodiment of the fluorographic system pre-FIFO 116 is formed with eleven type 745225 integrated circuits. The arrangement has the capacity for 16 51-bit words. The pre-FIFO is used, however, to store 6 51-bit words at a time. In the present invention, coaction between pre-FIFO 116 and RAM 117 allows great reduction in the number of pre-FIFO chips and in the RAM capacity that is required.

To obtain the clarity that results from using concrete numbers and without implying any limitation thereby, consider that the RAM 117 is a 1K×50 comprised of a number of chips that give it a 1024×50-bit word capacity. Successive 50-bit words are output from pre-FIFO 116 for each of its unload clocks and are input to RAM 117. In this example, every horizontal television line of data input on 10-bit bus line contains 768 10-bit words corresponding to pixels. The RAM is divided into 6 segments each of which has 160 locations for respective 50-bit words. In this example, 154 locations out of the 160 in a segment are needed. A segment can store a complete horizontal television line since 154×50 bits=7700 bits which exceeds the 7680 bits in a television line. Three horizontal lines are allowed to be written into RAM 117 at the start of a new frame before anything is allowed to be read out. Three lines uses up 3×160 or 480 locations of the 1024 available so there is excess RAM capacity. Only 480 horizontal lines per frame are used. Actually, there are only 6 starting addresses for new horizontal lines in the RAM for reasons which will be explained. In effect, a 6 horizontal line delay is being provided for.

The 50-bit words comprised of 5 10-bit pixels are unloaded from pre-FIFO 116 and loaded into addressed locations in RAM 117 in coincidence with unload clock signals by way of line 127 from a memory timing module. The timing module 125 time base is the output block pulse train that is input on line 40 which, as shown in FIG. 1, is the nominal 12.096 MHz clock derived through PLLs 42 and 43 which are based on the 30 Hz ac power line reference. A divider 126 divides the output or pixel clock train by 5 for the timing module. The 5 clock pulse cycles comprise what is called 1 memory cycle as illustrated in line A of the FIG. 6 timing diagrams. Since 5 input and output pixel clock times are allowed for writing in and reading from RAM 117, a slower and lower cost RAM can be used.

Figure 6:
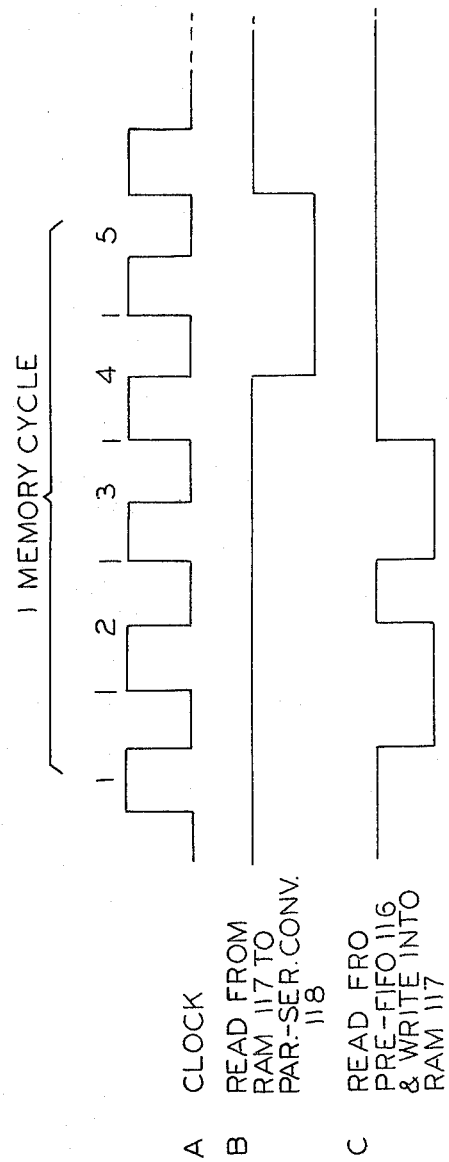

As shown in line B of FIG. 6, the latter portion of a memory cycle is allowed for reading a 50-bit word out of RAM 117 for input to parallel-to-serial converter 118 wherein in 50-bit words are converted to serial 10-bit pixel words again for further processing. Converter 118 is synchronized to the putput clock by way of line 130. As shown in line C of FIG. 6, the first portion of the memory cycle is divided into 2 write pulses that are supplied by way of line 128 from timing module 125 for enabling writing a 50-bit word from pre-FIFO 116 into RAM 117. It will be evident now that there is a capacity for doing zero, one or two writes of 50-bit words into RAM 117 and doing one readout during a memory cycle. Since the pre-FIFO 116 can be emptied twice as fast as it can be loaded, the pre-FIFO will always be close to empty.

Pre-FIFO 116 provides a data ready signal by way of line 129 which is so labelled. This signal indicates to memory timing module 125 that the last location in the pre-FIFO contains valid data. Timing module 125 monitors the data ready signal and tries to keep the pre-FIFO empty.

Segmenting the RAM 117 into six 160 location segments permits writing the leading parts of horizontal lines into RAM while the trailing parts are being read out. As will appear, RAM 117 is operated as a recirculating buffer. In accordance with the invention a great reduction in the amount of RAM capacity that is required and, hence, reduces cost and size of the system.

The 50-bit words are written from pre-FIFO into RAM 117 at RAM addresses that are generated in what is called address preset logic module 136. It comprises a modulo 6 horizontal line counter 137 in this example, and address storing programmable read-only memory 138 and an input address counter 135. The addresses are transmitted to RAM 117 by way of a bus 142, an address multiplexer 143 and a bus 144.

Assume in reference to FIG. 5, that a new frame or vertical sync pulse comes in on line 28. This resets the modulo 6 line counter 137 and input address counter 135 to zero. The ensuing horizontal sync pulse comes in by way of line 140. Counter 137 responds by addressing the first location in PROM 138 which location contains the starting address for line zero in RAM 117. Actually counter 137 will count up by 1 for every horizontal sync pulse and will recycle back to zero when 6 horizontal lines are counted. When the first starting address for line zero is transmitted from PROM 138 it presents input address counter 135 and it will count up to 154 and finally 160, the number of locations composing a horizontal line and the locations are filled with the consecutive 50-bit words that are input from the pre-FIFO. There is no read out of RAM 117 as yet. The input address counter 135 only gets the starting address for a line from PROM 138 after which the counter 135 counts up sequentially and its outputs are the successive locations in the 154 or actually 160 location segment. When the next horizontal sync, H, comes along modulo 6 line counter 137 again counts up by 1 and adresses the PROM. At that addressed location in PROM would be RAM address 160. This would result in the input address counter 135 being set to 160. It would then count 161 and up another 160 counts and each count would again be an address to a RAM location for the corresponding 50-bit words comprising a horizontal line. The process is repeated until the module 6 counter 137 reaches 6 and provides 6 consecutive starting address at which time counter 137 is reset to zero and it starts to count again in response to the next and the ensuing H sync pulses up to 6.

When 3 horizontal lines of a frame are written into RAM, readout of the RAM to parallel-to-serial converter 118 begins. The RAM will, of course, be able to hold 6 horizontal lines, but a 3 line delay is provided.

Output preset logic module 145 controls readout of consecutive 50-bit words from RAM 117 on a horizontal line by horizontal line basis. Logic module 145 also contains a module 6 horizontal line or sync pulse counter 146 connected by way of a bus 147 to a starting address containing PROM 148 and a bus 149 connecting it to output address counters 150. The output horizontal sync and vertical sync pulses on lines 57 are supplied from the power line referenced DVP sync generator 41 in FIG. 1.

Line counter 146 is reset to zero by the vertical, V, sync pulse. PROM 148 puts out the first starting address for horizontal line zero in RAM 117 after the first three horizontal lines of a frame are loaded into RAM. As in the case of input, output address counters 150 then count off the 154 and up to 160 locations for reading out of horizontal line zero. Modulo 6 counter 146 causes PROM 148 to provide a new starting address in response to horizontal sync pulses and the first three and next three lines are read out in sequence as they are addressed. When line zero of RAM is read out, for example, it is refilled with a new horizontal line and the ensuing lines are filled in sequence. Thus, the effect is that of a recirculating buffer wherein a read pointer in effect chases a write pointer and at some time the write pointer will come around and cause the start of new 50-bit data words over old data in successive locations. Because of the 3 line delay, input of data will always stay ahead of its output.

It should be noted that the addresses for readout of RAM 117 are transmitted from address counters 150 by way of a bus 151 to one input of address MUX 143 from which they are supplied to the RAM output address input by way of bus 144.

There must be a 50-bit word read out of RAM 117 for every memory cycle because the input processor 60 of the DVP 21 in FIG. 1 must get valid data for every memory cycle. Because every memory cycle is divided into one read and zero, one or two writes into RAM it has been possible to compensate for any speed variation between incoming and outgoing pixel data. The delay allows the output addresses to chase or follow the input addresses repeatedly. In the described embodiment of the FIFO buffer system the input and output clocks are about 12.096 MHz, but the input clock rate could be doubled for a memory cycle and it would still be possible to read out fast enough because of there being up to 2 readouts per write into RAM. Recognize that the average clock frequency for input to RAM should not exceed the average clock frequency at output or override would occur.

In summary, the system and subsystems described herein achieve substantial nullification of the effects of electromagnetic and electrostatic interference in the television camera system by locking the television system timing and an analog-to-digital converter to an ac power line reference. The result is that interference artifacts which may occur in any image will be likely to coincide with similar artifacts in other images such that when images are substracted the artifacts will cancel out.

As has been shown, a crystal time-based sync generator that is reset for each TV field in response to a reference signal that is locked to power line frequency assures that every horizontal TV line produced by the television camera during any frame will have the same size and will have interference artifacts located in the same place in the lines of any other frame so the artifacts will cancel out.

The manner in which the digital video processor, that processes originally acquired image data and reprocesses image data, has its sync generator locked to the ac power line reference for obtaining electromagnetic or electrostatic interference free timing has also been shown. Here again, any interference artifacts introduced in the video processor are likely to coincide in images and cancel out by substraction. Moreover, the power line-locked timing of the processor is used for providing stable and less variant horizontal and vertical sync signals to the analog video disk recorder which the recorder can easily track. A buffer system whose data input clock is locked to a stable crystal controlled sync generator and to the power line indirectly and whose output clock is referenced to the ac power compensates the difference between TV system timing and processor timing to thereby maintain image registry. The video disk recorder is read out for image reprocessing using the recorded power line referenced horizontal and vertical sync signals as the time base for the analog-to-digital converter and buffer system input lock which assures that images to be substracted will be in registry for cancelling interference artifacts that may have been introduced in the images.

Although a preferred embodiment of a new fully ac power line-lock digital fluorography system has been described in detail, such description is intended to be illustrative rather than limiting, for the invention may be variously embodied and is to be limited only by construing the claims which follow.

I claim:

1. Digital fluorography apparatus comprising means for converting pre-contrast and a sequence of post-contrast X-ray images, obtained before or after an X-ray contrast medium arrives in blood vessels of interest in a body, to corresponding optical images; a television camera having a target that is scanned to produce analog video signals representative of the optical images; an analog-to-digital converter (ADC) for converting successive samples of the analog signals in the horizontal lines comprising an image frame to a succession of digital pixel words having values corresponding to the intensities of the picture elements (pixels) in the frame, and means for eliminating the effect of power line frequency artifacts in the images, characterized by:

means for providing reset signals referenced to ac power line frequency and corresponding to television framd rate, a crystal controlled oscillator based sync generator operative to produce vertical sync pulses followed by a sequence of horizontal sync pulses for the television camera and the sample clock frequency for timing sampling of the analog video signals by said ADC, said sync generator responding to occurrence of each reset signal by initiating a new sequence of horizontal sync pulses for the next image frame, a digital video processor (DVP) including memory means and math processor means, said DVP being operative to substract digitally represented images and output the digital difference images, a second sync generator for providing vertical and horizontal sync signals for timing the operations of said DVP, phase-locked loop means having input means for being driven by said signals that are referenced to the ac power line frequency, said loop means being operative to provide signals that are coupled to said second sync generator for controlling it to produce said vertical and horizontal sync signals and to provide clock signals at a frequency corresponding substantially to said sample clock frequency, a buffer system having input means for said digital pixel words from said ADC and having means to output said words to said DVP at a rate that differs from the rate at which the pixel words are input from the ADC, clocking means that uses the sample clock frequency derived from said crystal controlled oscillator as a time base when operating in the image acquisition mode for clocking said pixel words into said buffer system and clocking means that uses the sample clock frequency derived from said phase-locked loop means for clocking said pixel words out of said buffer system, means for converting the digital difference image frames that are output from the DVP to analog video signals representative of the frames, and an analog video disk recorder for recording said analog video signals along with vertical and horizontal sync signals and to provide clock signals at a frequecy corresponding substantially to said sample clock frequency.

2. The apparatus defined in claim 1 including additional means for converting digital difference image frames that are output from the DVP to analog video signals representative of the frames, and television means for displaying the image represented by said analog video signals.

3. The apparatus defined in claim 1 including means for operating in an image reprocessing mode wherein difference images recorded on analog video disk are selectively substracted from each other to yield difference image frames, said means comprising:

means for transmitting said analog video signals for successive image frames from said disk recorder to said ADC in place of the analog video signals provided by said television camera during image acquisition, a sync signal stripper having input means for the composite video signals for the current frame accessed from said video disk recorder and operative to output stripped horizontal sync pulses correspondingly with their frequency on the disk, a phase-locked loop having an input for said stripped horizontal sync pulses and responding to said input by outputting a sample clock at a frequency that is locked to and varies with the stripped horizontal pulse frequency, and means for using said last named sample clock to clock sampling by said ADC and as the input clock time base for said buffer system during reprocessing in place of the sample clock derived from said crystal oscillator sync generator during imnage acquisition.

4. A digital fluorography system including a television camera for acquiring X-ray images that are to be subtracted to yield difference images wherein everything that is constant in the subtrated images is substantially cancelled and wherein the television camera is subject to power line frequency interference that produces artifacts in the images; means for converting pre-contrast X-ray images and a sequence of post-contrast X-ray images, obtained after an X-ray contrast medium arrives in blood vessels of interest in a body, to corresponding optical images, said television camera having a target that is scanned to produce analog video signals representative of the optical images; an analog-to-digital converter (ADC) for converting successive samples of the analog video signals in the horizontal lines comprising an image frame to a succession of digital pixel words having values corresponding to the picture elements (pixels) in the frame; and, means for eliminating the effects of said power line frequency artifacts in the images by including them to register so they will cancel when substracted characterized by:

a phase-lock loop having input means coupled to said power line and operative to output reset signals referenced to and varying with ac power line frequency an at a frequency corresponding to the television frame rate, a crystal-controlled oscillator based sync generator operative to produce the timing signals for the television camera including vertical sync signals followed by a sequence of horizontal sync pulses and to produce a clock frequency for timing sampling of said analog video signals by said ADC, said sync generator responding to occurrence of each power line referenced reset signal by initiating a new sequence of accurately spaced in time horizontal sync signals for the next image frame such that any power line interference artifacts in successive images will register, second phase-locked loop means having input means for said sync generator for said ac power line reference and reset signal, said loop means being operative to provide three frequencies that are locked to and vary with said ac power line reference signal, one of said frequency corresponding nominally to said ADC sample clock frequency, another being a frequency corresponding nominally to said reference signal frequency and another corresponding nominally to said horizontal sync signal frequency, digital video processor (DVP) means including memory means and math processor means, said DVP being operative to subtract digitally represented image frames and output the resulting digital difference image frame data at video rates, means for converting said difference image frame data to analog video signals, a disk recorder for recording the analog video signals, a second sync generator controlled by signals derived from said second power line referenced phase-locked loop means to produce the timing signals for said DVP and the horizontal and vertical sync signals for being recorded with the difference image video signals by the disk recorder, and a buffer system using said sample clock frequency derived from said crystal controlled sync generator as a time base for clocking said digital pixel words into it form said ADC and using said nominal sample clock frequency derived from said second phase-locked loop means to clock said pixel words out of it to said DVP.

5. The apparatus defined in claim 4 including another means for converting said digital difference image frame data to analog video signals, and television means for displaying the difference images represented by said analog video signals.

6. The apparatus defined in claim 2 including means for operating in an image reprocessing mode wherein difference images recorded on disk are selectively subtracted from each other to yield difference image frames, said means comrpising:

means for transmitting said analog video signals for successive image frames from said disk recorder to said ADC in place of the analog video signals provided by said television camera during image acquisition, a sync signal stripper having input means for the composite video signals for the current frame accessed from said video disk recorder and operative to output stripped horizontal sync pulses correspondingly with their frequency on the disk, a phase-locked loop having an input for said stripped horizontal sync pulses and operative to output a sample clock at a frequency that is locked to and varies with the stripped horizontal pulse frequency, and means for using said last-named sample clock to clock sampling by said ADC and as the input clock time base for said buffer system during reprocessing in place of the sample clock derived from said crystal oscillator sync generator during image acquisition.

* * * * *

UNITED STATES PATENT AND TRADEMARK OFFICE
CERTIFICATE OF CORRECTION

PATENT NO. : 4,468,696
DATED : August 28, 1984
INVENTOR(S) : Barry N. Stone

It is certified that error appears in the above-identified patent and that said Letters Patent are hereby corrected as shown below:

column 20, line 64, change "framd" to ---frame column 21, line 52, change "substracted" to ---subtracted--- column 22, line 5, change "immage" to ---image--- column 22, line 10, change "subtrated" to ---subtracted--- column 22, line 27, change "including" to ---inducing--- column 22, line 32, change "an" to ---and--- column 22, line 51, after "one of said" and before the words "frequency corresponding nominally to", the following should be inserted ---frequencies being an output clock--- column 23, line 7, change "form" to ---from---.

Signed and Sealed this

Twenty-sixth Day of February 1985

[SEAL]

Attest:

DONALD J. QUIGG

Attesting Officer    Acting Commissioner of Patents and Trademarks